United States Patent
McGuire et al.

(10) Patent No.: US 6,493,871 B1
(45) Date of Patent: Dec. 10, 2002

(54) METHOD AND SYSTEM FOR DOWNLOADING UPDATES FOR SOFTWARE INSTALLATION

(75) Inventors: Thomas D. McGuire, Woodinville, WA (US); Michael V. Sliger, Issaquah, WA (US); Daniel C. Welch, Redmond, WA (US); Rajendra H. Vishnumurty, Bellevue, WA (US); Gabriel J. Aul, Seattle, WA (US); Oliver I. Wallace, Redmond, WA (US); Gregory W. Nichols, Seattle, WA (US); Alan B. Auerbach, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/397,536

(22) Filed: Sep. 16, 1999

(51) Int. Cl.[7] .............................................. G06F 9/445
(52) U.S. Cl. ...................... 717/173; 717/169; 717/171; 717/172; 717/175; 717/178
(58) Field of Search ................................ 717/168, 169, 717/170, 171, 172, 174, 175, 176, 177, 178, 173

(56) References Cited

U.S. PATENT DOCUMENTS

| | | | | |
|---|---|---|---|---|
| 5,845,090 A | * | 12/1998 | Collins, III et al. | 709/221 |
| 5,919,247 A | * | 7/1999 | Hoff et al. | 709/217 |
| 5,930,513 A | * | 7/1999 | Taylor | 717/174 |
| 5,960,204 A | * | 9/1999 | Yinger et al. | 717/176 |
| 6,006,035 A | * | 12/1999 | Nabahi | 717/175 |
| 6,067,582 A | * | 5/2000 | Smith et al. | 710/5 |
| 6,167,567 A | * | 12/2000 | Chiles et al. | 717/173 |
| 6,199,204 B1 | * | 3/2001 | Donohue | 717/178 |
| 6,256,668 B1 | * | 7/2001 | Silvka et al. | 709/220 |
| 6,266,811 B1 | * | 7/2001 | Nabahi | 717/174 |
| 6,282,709 B1 | * | 8/2001 | Reha et al. | 717/175 |
| 6,282,711 B1 | * | 8/2001 | Halpern et al. | 717/175 |
| 6,301,710 B1 | * | 10/2001 | Fujiwara | 717/175 |
| 6,314,565 B1 | * | 11/2001 | Kenner et al. | 717/171 |

OTHER PUBLICATIONS

Title: Updating Software and configuration data in a distributed communication network, IEEE, 1988, author: Symbroski.*
Title: Efficient Transparent Application Recovery In client server information system, ACM, 1998, author: Lomet et al.*
Microsoft Corporation, *TechNet CD Online*, Aug. 18, 1999, Available from http://www.technet.com./cdonline/toc.htm.
Microsoft Corporation, *IExpress*, Aug. 18, 1999, Available from http://aicgweb/iexpress/.

* cited by examiner

Primary Examiner—Gregory Morse
Assistant Examiner—Chameli C. Das
(74) Attorney, Agent, or Firm—Leydig, Voit & Mayer, Ltd.

(57) ABSTRACT

A method and system for downloading software update data for installing a revised software product on a client computer minimizes the amount of update data to be transmitted over the network by downloading only those files needed to put the client computer in the state for installing the product. In the beginning of the downloading process, the client computer obtains from a setup server an initial setup package that includes a setup program and a list of files required for installing the software product. The setup program running on the client computer then determines whether some current or earlier versions of those files required for installation already exist on the client computer, and compiles a request list of files needed for updating the client computer. The client computer sends the request list to a download server, which maintains a collection of update files and patches. In response to the request list, the download server downloads updating files to the client. Depending of the availability of the requested files or other factors, the downloaded files may or may not be exactly those requested. Using the downloaded files, the setup program updates the existing files to provide the set of installation files on the client computer. The desired revised software product is then installed on the client computer.

50 Claims, 12 Drawing Sheets

FIG. 4
UPDATE.INF  /— 108

```
[Version]
Signature="$Windows NT$"
SourceFilesURL=http://svcpacks.microsoft.com/isapi/pstream.dll/nt4sp5/USA/x86

[ProductInstall]
AddReg=Product.Add.Reg

[ProductInstall.CopyFilesAlways]
CopyFiles=CopyAlways.System32.files

[ProductInstall.ReplaceFilesIfExist]
CopyFiles=System32.files
CopyFiles=Drivers.files

[ProductInstall.UniprocessorFiles]
CopyFiles=Uniprocessor.Kernel.files

[ProductInstall.MultiprocessorFiles]
CopyFiles=Multiprocessor.Kernel.files

[Product.Add.Reg]
HKLM,SYSTEM\CurrentControlSet\Control\Windows,"CSDVersion",0x10001,0x500

[CopyAlways.System32.files]
CHKNTFS.EXE
REGSVR32.EXE
C_1250.NLS

[System32.files]
OLE32.DLL,,,8
WSOCK32.DLL,,,8

[Drivers.files]
4MMDAT.SYS
CPQARRAY.SYS
DLTTAPE.SYS
E100B.SYS
EL59X.SYS
EL90X.SYS
JOYSTICK.SYS
```

UPDATE.INF — 108

(CONTINUED)

[Uniprocessor.Kernel.files]
NTOSKRNL.EXE

[Multiprocessor.Kernel.files]
NTOSKRNL.EXE, NTKRNLMP.EXE

[SourceDisksNames]
1="Windows NT 4.0 Service Pack 5 Source Files"

[DestinationDirs]
CopyAlways.System32.files=11    ; %windir%\system32
System32.files=11               ; %windir%\system32
Drivers.files=12                ; %windir%\system32\drivers
Uniprocessor.Kernel.files=11    ; %windir%\system32
Multiprocessor.Kernel.files=11  ; %windir%\system32

[SourceDisksFiles]
CHKNTFS.EXE = 1,,,00040000056500C9,AF876D8F8DA7230C4D38BE30D3F92209
REGSVR32.EXE = 1,,,0005000006320001,36D4F9E22C2C3EFBE4160B8F8A4E9E7C
C_1250.NLS = 1,,,,57A36CD7B3557535D4AFFB00F4D48EC6
OLE32.DLL = 1,,,00040000056500BE,D8B9C2912D861BD59B8639B5B56762DD
WSOCK32.DLL = 1,,,00040000056500C9,66F61F5775101C8CAF2861580BD12651
4MMDAT.SYS = 1,,,000400000565001B,CBD48BCEF66F1A157F24F5A75213289F
CPQARRAY.SYS =
1,,,000400000565001B,AB61030B0C848A2CE114718FE79BAAB6
DLTTAPE.SYS = 1,,,000400000565001B,924D959A5206222D77D5244CF2D8B796
E100B.SYS = 1,,,00020000000D0000,6061CA3B0EC4DAFB531EBCC8F40BC822
EL59X.SYS = 1,,,0001001200000000,0AF331C5A790FDA8F87830EBFFC68234
EL90X.SYS = 1,,,0002001800280000,5E94EDA2C5266430F5A867D326E6DFD3
JOYSTICK.SYS = 1,,,000400000565001B,6EEC943B27C0507C49F2C968E0F429C3
NTOSKRNL.EXE = 1,,,00040000056500CC,DCA974D791BA1553242F496166E3E789
NTKRNLMP.EXE = 1,,,00040000056500CC,1929FA437794429B42596938789BCC26

FIG. 5

THE "NEEDED FILES" LIST 120

CHKNTFS.EXE, BD23014729AD8940282FF2AAC2392041

REGSVR32.EXE

OLE32.DLL, 2F776F7166CB116E38FE7724A9825A6F

WSOCK32.DLL, 8016769ECBBE2EE59026B7C50A54D693

CPQARRAY.SYS, 0C86837A511875782462268D54C7C227

E100B.SYS, D49BB53612C639E36E05B941B1BF4AA9

NTKRNLMP.EXE, 889BAB304A2246950C25539698FE97A6

FIG. 6

FILE DOWNLOAD REQUEST 122

FileList:7

CHKNTFS.EXE,BD23014729AD8940282FF2AAC2392041

CPQARRAY.SYS,0C86837A511875782462268D54C7C227

E100B.SYS,D49BB53612C639E36E05B941B1BF4AA9

NTKRNLMP.EXE,889BAB304A2246950C25539698FE97A6

OLE32.DLL,2F776F7166CB116E38FE7724A9825A6F

REGSVR32.EXE

WSOCK32.DLL,8016769ECBBE2EE59026B7C50A54D693

FILES ON SVCPACKS.MICROSOFT.COM IN nt4sp5\USA\x86 DIRECTORY

```
CHKNTFS.EX_
CHKNTFS.EXE_0F76114CE9FA2D60A7C22D25AE450814.P
CHKNTFS.EXE_1C5437115A9BAC420C3CD1F831F56F30.P
CHKNTFS.EXE_42AFB44AF2045C7A74C271598E579BDA.P
CHKNTFS.EXE_BD23014729AD8940282FF2AAC2392041.P
CHKNTFS.EXE_EED2C140A583875C7C8A5D0967C7A5A7.P
CPQARRAY.SY_
CPQARRAY.SYS_0C86837A511875782462268D54C7C227.P
CPQARRAY.SYS_13CF9F524D61F83CB43E473B327654AB.P
CPQARRAY.SYS_423FC467DE3959B865439731E0D63A7F.P
CPQARRAY.SYS_925181D4098D7F689F2BA2AB520F6F4F.P
CPQARRAY.SYS_F57EC67E4A963F441DEFDB386349DE00.P
E100B.SY_
E100B.SYS_6C47AB2854FFDB36144CCB7C660F7A41.P
NTKRNLMP.EX_
NTKRNLMP.EXE_78EBE1089495CA22472C3B0BDC36CC05.P
NTKRNLMP.EXE_889BAB304A2246950C25539698FE97A6.P
NTKRNLMP.EXE_AEAE2680F3A7CE9AE47EEE4F492E4366.P
NTKRNLMP.EXE_AF3C35148947186693C86F57EB167739.P
NTKRNLMP.EXE_D79E5E52EA6EC6B634C3AD23A1D6CE77.P
NTKRNLMP.EXE_DB3F2D54DA579EFE9B7BB94DF4C93F7B.P
OLE32.DL_
OLE32.DLL_2F776F7166CB116E38FE7724A9825A6F.P
OLE32.DLL_99C40CE9E2A69ED69088C77937A10330.P
OLE32.DLL_DC7CE6C78C898004658E7195B1C40CB1.P
REGSVR32.EX_
REGSVR32.EXE_01ABC7353F12FA12FEC4C527A025F13A.P
REGSVR32.EXE_2A5E10758D37DA569BBFCE5E46E36CA1.P
REGSVR32.EXE_2C97E02D5B4EF71B5CDFD3F060E6A27E.P
REGSVR32.EXE_362878CFB3E65063513A3090FA915ED2.P
REGSVR32.EXE_DFA7B492F043F316B93683462E726825.P
REGSVR32.EXE_F1CA707D97CF9D44E8AB7F8758FF6184.P
WSOCK32.DLL
WSOCK32.DLL_015E7FA076ADEB3EEF1F2D1171F78F32.P
WSOCK32.DLL_29AC4AE58B8716C9BFD29633B4391805.P
WSOCK32.DLL_B294DABFF380A2768567F10BC032A92C.P
```

FIG. 8

DOWNLOAD REPLY 160

```
HTTP/1.1 200 OK
Via: 1.1 CORP-PROXY-8
Proxy-Connection: Keep-Alive
Content-Length: 122482
Content-Type: text/html
Server: Microsoft-IIS/4.0
Date: Thu, 07 Nov 1998 21:47:09 GMT Download Header:
<body>
FileList:7
CHKNTFS.EXE.P,3305
CPQARRAY.SYS.P,2704
E100B.SY_,47108
NTKRNLMP.EXE.P,11612
OLE32.DLL.P,27492
REGSVR32.EX_,9739
WSOCK32.DLL,20480
</body>
 .
 .
 .
```

FIG. 9

DOWNLOAD REPLY                    170

HTTP/1.1 200 OK
Via: 1.1 CORP-PROXY-8
Proxy-Connection: Keep-Alive
Content-Length: 122452
Content-Type: text/html
Server: Microsoft-IIS/4.0
Date: Thu, 07 Nov 1998 21:47:09 GMT Download Header:
<body>
FileList:7
</body>
    .
    .
    .

FIG. 10

File Download Data Format

| Field Name | Field Size | Description |
|---|---|---|
| FileIndex | 2 | 0=1st file in Request, 1=2nd, etc. |
| Attributes | 2 | 0=normal, 1=compressed, 2=patch |
| FileSize | 4 | length of the FileData field |
| FileData | (FileSize) | contents of file |

FIG. 11

METHOD AND SYSTEM FOR DOWNLOADING UPDATES FOR SOFTWARE INSTALLATION

TECHNICAL FIELD OF THE INVENTION

This invention relates generally to the installation and updating of computer software products, and more particularly to the downloading of update data needed for updating a software product or components thereof.

BACKGROUND OF THE INVENTION

Most popular software products nowadays constantly go through revisions to fix "bugs" or add new features and functionality. To that end, each revision of a software product or component may require the addition of new files and/or the replacement of existing files with files of newer versions. Once a vendor has isolated a software product problem and created a solution for the problem, it would want to put that fix into an update and make the update widely available to the customers. Software vendors have a business incentive to distribute software updates to customers as quickly and trouble-free as possible.

The Internet provides an important channel for customers to obtain the latest updates for software products. The explosive growth of Internet usage has created a common expectation by customers that software products and updates be provided online for downloading. It is also in the interest of software vendors to promote the use of the Internet to distribute updates, because it reduces their costs and allows customers to obtain the fix for an identified problem as soon as the fix is made available for downloading. The vendor sites on the Internet can be designed to make it very simple to discover and locate update files for an application. The technical aspects of file download have mostly disappeared from the user's view, and are now typically handled by the operating system.

In a conventional approach, a software vendor constructs a software update as a "package" for download. This package is typically a self-extracting executable file with the setup program and each of the product's updated files embedded and compressed to make the package smaller. The size of the package is generally the sum of the compressed sizes of each changed file, plus the size of the extraction code itself. Upon execution, the package extracts each of the contained files to a temporary location, then starts the setup program to install each file to a proper location in the system's directory. Files that are shipped in a compressed form are decompressed as they are installed. Any existing file of the same name in the same location would simply be overwritten by the replacement file.

Even though the Internet makes wide and quick distribution of software updates possible, the limited bandwidth of network transmission has caused problems. The sheer sizes of common software applications have caused the download sizes of updates to become unreasonable large. Usually a multitude of fixes for a variety of problems of a product will be grouped into an update. If a vendor updates a software product on a regular basis, the download size of the update package will continue to grow, because the vendor cannot omit files under the assumption that the user already has those files from earlier updates. Because the update package combines a number of whole files, it may be quite large even when the files are compressed. Sometimes, even on the fastest modem connections, several hours are needed to obtain the update for a single product.

The time-consuming aspect of the conventional downloading process is, of course, undesirable. In some cases, customers pay long-distance or connection time charges during these file downloads. Any reductions in connection time will reduce the direct monetary cost for these customers. The vendors typically also have some distinguishable costs relating to the sizes of downloads they provide, so reducing the sizes may give them direct monetary benefits as well. Reducing the sizes of downloads will increase their available network bandwidth, allowing them to serve more customers with existing network server equipment.

The long time it takes to download a large update also makes the downloading process more vulnerable to various network connection problems. There are a number of reasons why an Internet session might be disconnected prematurely, including telephone line noise, call-waiting signals, and unintentional commands. Some Internet service providers enforce a connection time limit, limiting the amount of time the user can be on-line in a single session. If the user is downloading a large file when the network connection is cut off, they may have to start over. Most common operating systems and file transfer protocols do not allow the file transfer to be resumed, so any interim progress would be lost, and the transfer would have to be restarted. The opportunities for failure are so numerous that many users find it nearly impossible to obtain the update online. If the size of an update package is too large, they may never be able to completely download it.

Another significant drawback of the conventional update downloading approach is that it can be fairly inefficient. Many downloaded files are actually never used for updating the software product. Larger software applications frequently have a wide variety of installation options, and very few customers will actually use all of these options. Some examples include spell checkers, document templates, and assistance features for the visually impaired. Another example of common installation option relates to drivers for printers. Most users will need only one or two printer drivers out of a collection of hundreds. Since the vendor has no way of knowing in advance which options will be needed, it would normally include the fixes for all product options in the update package. At setup time, the setup program will recognize that certain files do not need to be installed, so some of the data that was downloaded will be discarded. Since some software products, such as the spell checker, share files with other products, it is possible that the customer will already have installed one or more of the updated files on the system. Again, some of what was downloaded (the spell-checker, in this case) will be discarded.

More recently, vendors have begun to utilize binary patching techniques to update older versions of files into their new forms. The changes needed to modify an existing file into a new form are detailed in a "patch." Usually, itemizing the changes needed to alter an existing file will take significantly less space than the entire new file would. Data compression techniques will frequently reduce executable files by a ratio of about 3:1, proportional to the original file size. In comparison, the latest file patching techniques achieve ratios more closely proportional to the size of the changed contents, and patching "compression" ratios between 10:1 and 100:1 are common.

To utilize patching for software updates, the vendor must be aware of which versions of files have already been distributed. Most patching tools will accept multiple "old" file versions as input, and produce a patch that is usable on any of those versions processed. The patch, however, cannot be used to convert a version that is not included in the input for generating the patch. The patch produced for multiple older versions will be larger than a patch prepared for only one of the older versions.

A download package that exploits patching is typically an executable file with the setup program and a patch for each of the product's updated files embedded. The size of the update file to be downloaded is generally the sum of the sizes of each patch file plus the size of the extraction code itself. Upon execution on a customer's computer, the setup program reconstitutes each of the updated files by combining the existing files on the customer's computer with the corresponding patch data. The included setup program then installs each reconstituted file to the proper locations in the system's directory structure. Patches, of course, cannot not be used to update files that have not been previously shipped to the customer or somehow are not found on the customer's system, and the full copies (which may or may not be compressed) of such files have to be downloaded. An update package containing mostly patches and few or no complete files can potentially be significantly smaller than a package with most full files. A patch package may thus require considerably less time to download as compared to conventional update packages.

The patching download approach, however, still has many of the other deficiencies of a full download. Moreover, it introduces a few new, and much more serious, opportunities for failure. The additional risks in patching download come from the need to try to anticipate, at the time the package is constructed, which versions of which files will be present on a customer's system. If the vendor has shipped multiple versions, interim releases, test fixes, or previous update packages, then every revision of an existing file should be considered in preparing a patch. If the customer's system contains a version of a file that was overlooked by the vendor (for example, an update that was subsequently produced for another problem), the customer will discover only after downloading the package that one or more of the patches cannot be applied. If the vendor has not included any provision to deal with this scenario, the customer may end up running an untested combination of programs. For an operating system update, the user may not even be able to restart their machine to try another update. For many customers, this risk may outweigh any benefit of implementing the update.

Thus, supplying every prior revision of each file of the software product to the patch generator appears crucial to avoid the patch-mismatching problem. Careful tracking procedures can be used to make sure no revisions are missed from the from the update package. The size benefit of a patch download, however, can dissipate quickly if the vendor attempts to include patching data for all earlier versions of the files of the software product. Each additional prior version supplied to the patch generator will cause the patch size to increase. For instance, an operating system may have thirty major service packs and a thousand minor updates supplied over its lifetime. The patching package may become so large that it would be better to ship that full file in compressed form instead, thus defeating the purpose of using binary patching in the first place.

The patch download approach, like the full-file download approach, is also not satisfactory in terms of efficiency and reliability. When a patch file contains change information for multiple revisions, it will be larger than it would be for any one of those revisions. The difference in size is recognized as additional downloaded data that will be discarded. Patches for options that might not be installed and patches for shared files that might already be installed must be supplied. The downloading of a patching package is also subjected to all the connection problems experienced by the full-file download approach. In short, a patching download has many of the deficiencies of a full download, except possibly the reduced download size. The added possibility of errors due to file-patch mismatch, however, may make this approach unacceptable to many users.

Thus, there is a great need for a more efficient and robust way to download update data for installing a revised software product.

SUMMARY OF THE INVENTION

In view of the foregoing, the present invention provides a method and system of downloading update data for installing a software product on a client computer that minimizes the amount of data to be downloaded by downloading only those files needed to update the client computer. In the beginning of the downloading process, the client computer obtains from a setup server an initial setup package, which includes a setup program and a list of files required for installing the software product on the client computer. The setup program running on the client computer determines whether some current or earlier versions of those files required for installation already exist on the client computer, and compiles a download request with a list of files needed for updating the client to provide the required installation files. The download request is automatically sent to a second server (which may be the same as the setup server) that stores a collection of update data, such as files and patches. The second server, in response to the request, prepares update files corresponding to the requested files and downloads them to the client. The downloaded files may or may not be exactly the requested files. Using the downloaded files, the setup program updates the existing files to create the set of installation files for the revised software product on the client computer. The revised software product is then installed on the client computer.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 is a diagram showing the contents of an exemplary script file extracted from the setup package that contains information regarding files required for installing the revised software product;

FIG. 5 is a diagram showing a list of files identified as needed by the client computer for downloading;

FIG. 6 is a diagram showing a download request incorporating the list of needed files of FIG. 4;

FIG. 8 is a diagram showing a list of update files maintained by the download server for installing the revised software product;

FIG. 9 is a diagram showing contents of a reply package containing update files to be downloaded to the client computer;

FIG. 10 is a diagram showing contents of a reply of an alternative embodiment with dynamic file ordering in the downloaded data stream;

FIG. 11 is a diagram showing a data structure for use in the reply of FIG. 10 for dynamic file ordering.

DETAILED DESCRIPTION OF THE INVENTION

Figure 1:
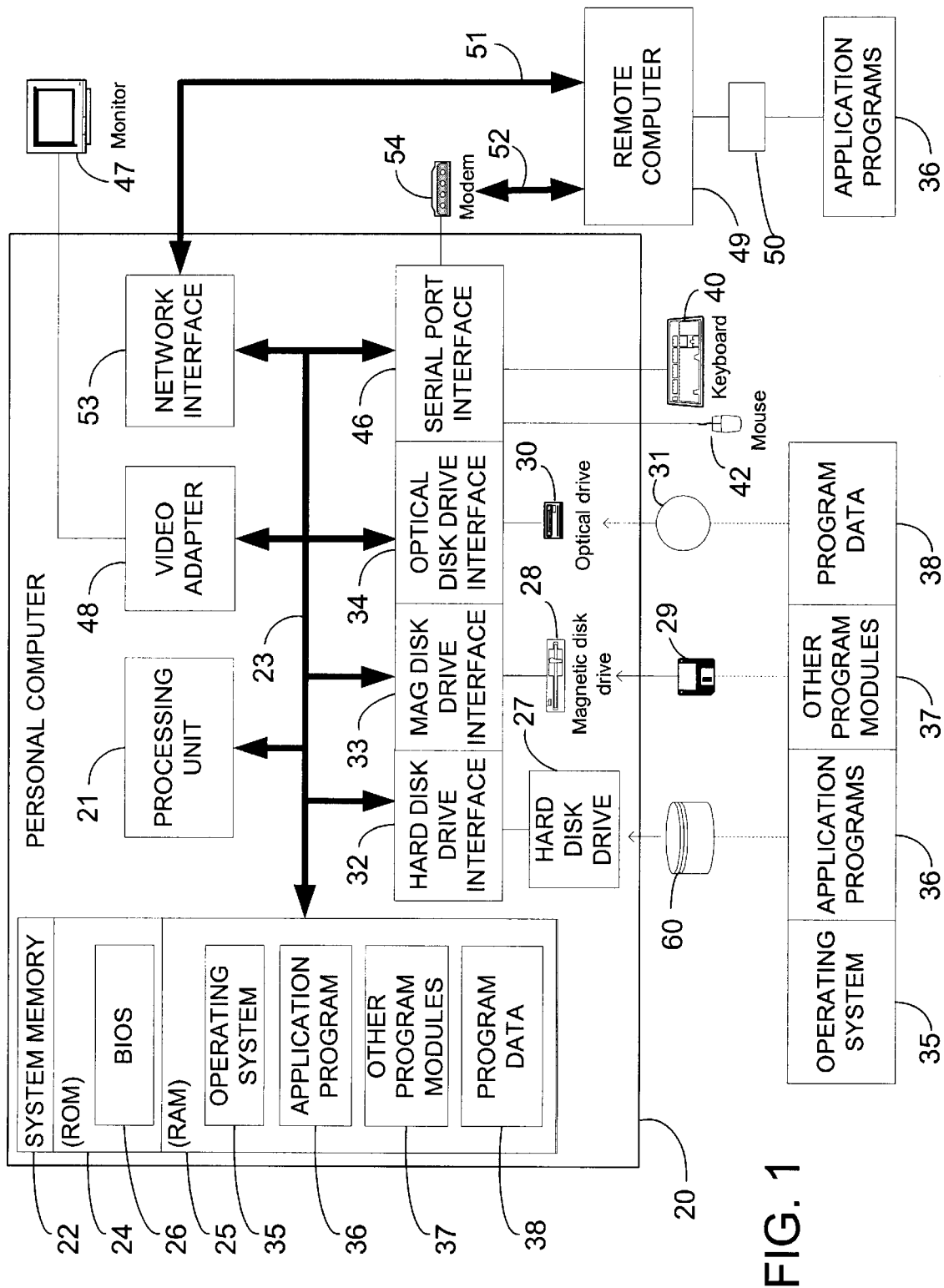
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
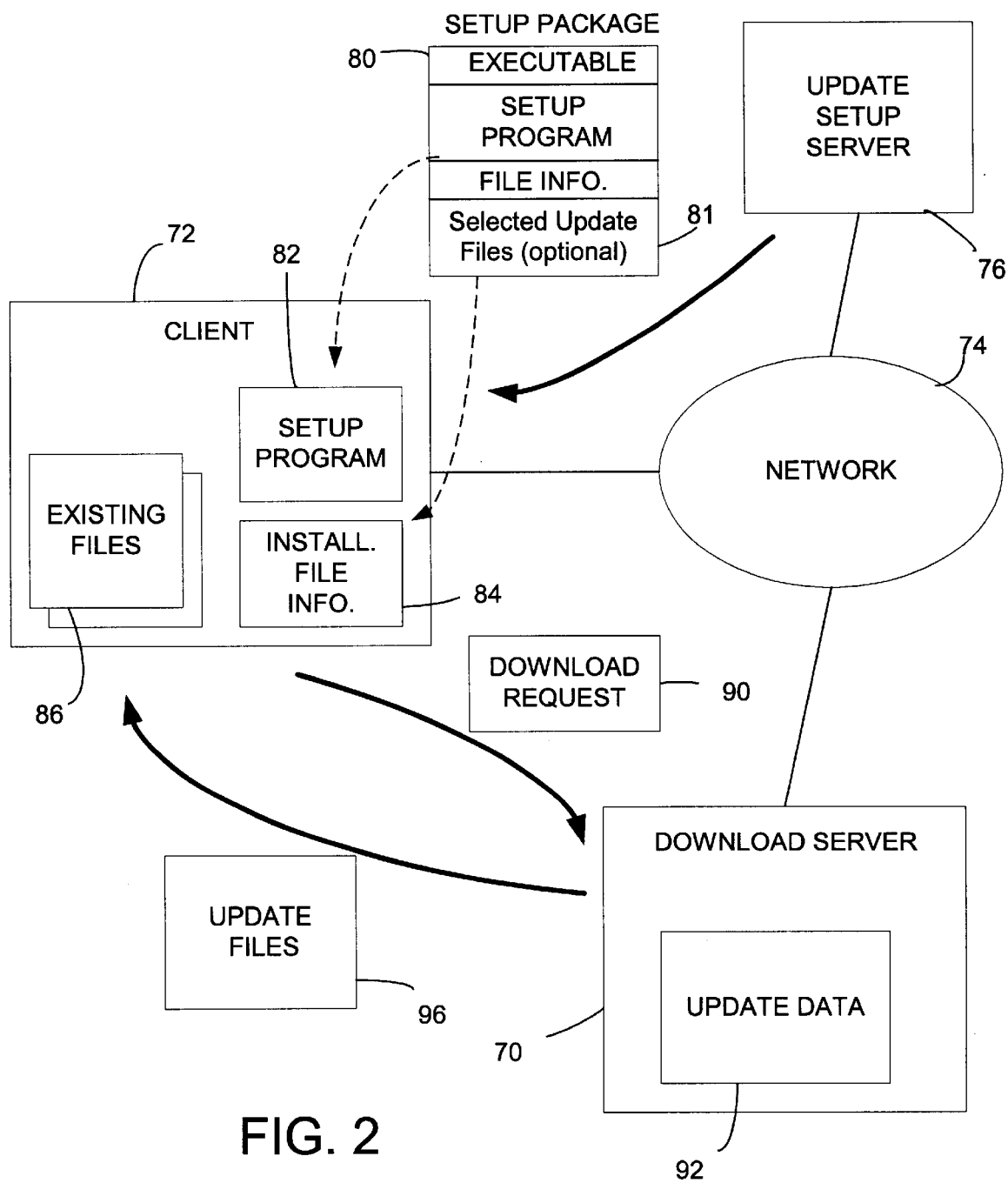
FIG. 2 is a schematic diagram showing a system embodying an architecture for downloading updates for installing a revised software product on a client computer according to the invention.

Referring now to FIG. 2, the present invention is directed to an efficient way to download update data from a download server 70 to a client computer 72 for installing a revised version of a software product on the client computer. The revised software product to be installed may be, for instance, the newest revision of the Internet Explorer of Microsoft Corporation. The client computer may or may not have already had an earlier version of the specific product. Generally, the installation of the revised software product requires the client computer to have a specific set of files, some of which the client computer may not presently have. The creation of the set of required installation files on the client computer requires the client computer to download pertinent update data from a download server across a network 74, which may be, for example, the Internet or other wide-area network (WAN).

In accordance with a feature of the invention, the amount of update data to be transmitted across the network 74 is minimized by downloading only the files needed to build on the existing state of the client computer to provide the installation files. To that end, the client computer first downloads from a setup server 76 an initial setup package 80, which includes a setup program 82 and information 84 regarding which files are potentially required for installing the revised software product. As will be described in greater detail below, the downloading of the setup package is substantially separated from the subsequent downloading of actual update data for constructing the files requires for installing the software product. The setup program executing on the computer then scans the existing files 86, if any, on the client computer. Based on the installation information and the existing files, the setup program 82 determines which files are needed to add to or update the existing files to provide the set of installation files, and compiles a "needed files" list. The needed files may be whole files or patches for specific files existing on the client 72. The list of needed files is included in a download request 90 and sent to the download server 70, which may or may not be the same as the setup server 76 from which the client obtains the setup package 80. The download server 70 maintains a database of update data 92 for the software product that can be downloaded upon request. When the download server 70 receives the download request, it compares the list of needed files with available update data, and returns update files 96 to the client. After receiving the download reply, the setup program uses the files in the download reply to update the existing files to generate on the client computer the required installation files. The desired revised version of the software product is then installed on the client computer.

In accordance with an aspect of the invention, for a file in the request, the download server preferably has the flexibility of choosing a file from several available update files that is deemed the optimal response. For example, if the request indicates that the client already has an older version of a file on the client, the download may return either a patch for that version or to return the entire new version of that file. How the download server responds to a file request may depend on various factors, such as the availability of a matching patch, the download size of a full new file, the workload of the server, etc.

Figure 3:
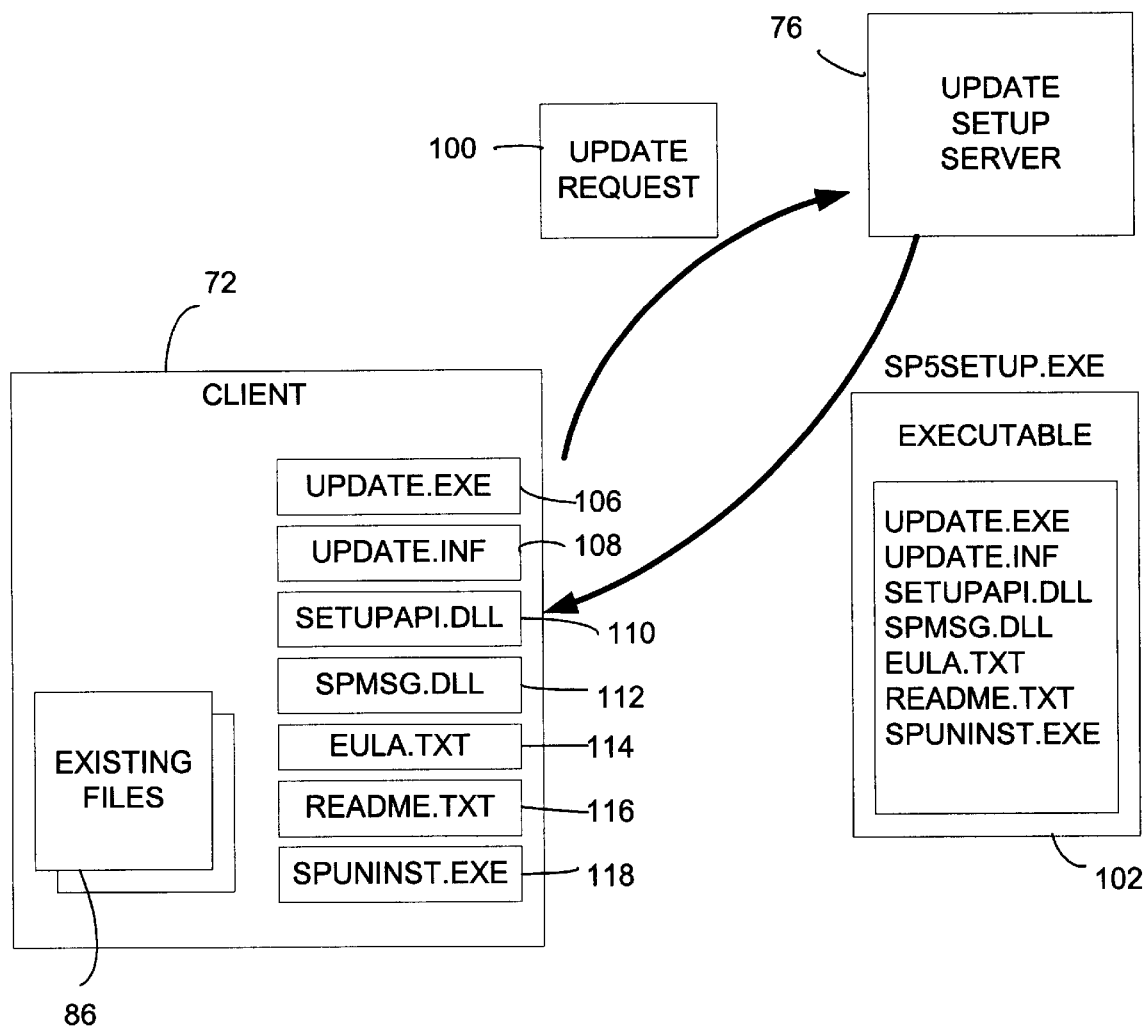
FIG. 3 is a schematic diagram showing an embodiment in which a client computer obtains an initial setup package for update downloading.

By way of example, an embodiment that implements the downloading process will be described in greater detail below. In this example, for illustration purposes, it is assumed that the user of a client computer intends to download the update data for a software product called ABC and of version number 5.0 (hereinafter "ABC 5.0"). As shown in FIG. 3, the update downloading process is initiated when the user of the client computer 72 sends an update request 100 to the setup server 76 to download an initial setup package 102. This initial setup package 102 is a small self-extracting executable data structure commonly known as a "cabinet" file." In the illustrated example, this self-extracting executable is named SP5SETUP (where "SP5" stands for Service Pack No. 5) and includes seven embedded files, as shown in FIG. 3. It has been code-signed using security system such as Microsoft Corporation's Authenticode, allowing the user to verify its authenticity before execution. It is launched from a selection on a web page.

After the SP5SETUP file 102 is downloaded to the client computer, it is executed to self-extract the files embedded therein. Of the seven files extracted from SP5SETUP.EXE, the main files are the UPDATE.EXE file 106, which controls the remainder of the installation after the self-extractor runs, and the UPDATE.INF file 108, which is a script file that defines which files get copied, where they are copied to, etc. The SETUPAPI.DLL file 110 contains general-purpose file installation subroutines that are used by UPDATE.EXE. The SPMSG.DLL file 112 contains all the localized dialogs and messages needed by UPDATE.EXE for multi-language support. The EULA.TXT file 114 and the README.TXT file 116 are the end-user license agreement and "read me" files, which UPDATE.EXE will display for the user's consent before installation. The SPUNINST.EXE file 118 is the un-install utility, supplied in case the user wishes later to remove the installed updates. The operations of UPDATE.EXE and how the elements of the script file UPDATE.INF are described in greater detail below.

The setup package in this example does not contain any update files for the software product. It will be appreciated, however, that some update files, which may be normal, compressed, or patch files, for installing the revised software product may be judiciously included in the setup program. Generally, it may be economic in some cases to include selected update files in the setup package when those files are relatively small and are highly likely to be used for updating the software product on the client computer. Thus, the inclusion of selected update files 81 (FIG. 2) in the initial setup package is optional and does not deviate from the scope and spirit of the invention.

In the embodiment of FIG. 3, the UPDATE.EXE file 108 is the setup program 82 referenced previously in FIG. 2. It contains the core logic to install each of the needed changes to deliver Service Pack No. 5. The UPDATE.EXE program performs its function, which is to download the files needed to update the client computer for installing ABC 5.0, in two passes. In the first pass, the setup program checks for installed features of the ABC product on the client, and determines which files are to be copied to the client computer in order to install ABC 5.0. In this initial operation, UPDATE.EXE runs its course without actually changing any of the files or settings on the system, but creates a list of files that are needed to provide the set of files for installing the revised software product. UPDATE.EXE prepares this list by referring to the UPDATE.INF file 108 for information regarding the required installation files and performing a system inventory on the client computer to identify existing files from the previous installation of ABC. A "needed" file may be a new file that does not yet exist on the client, or a patch for updating an existing file that is an older version of a file required for installing the revision of ABC. Since the patching data for an existing file depends on the specific version of that file, the "needed files" list contains information to identify which version of the file is found on the client.

In accordance with a feature of the embodiment, the version identification does not rely on typical file version information such as a version number. Instead, each version of a given file is identified by a hash number generated by applying to it a hash function, such as the known MD5 algorithm. The hash values of different versions of a given file provide unique identifications to distinguish the respective versions.

To create the "needed file" list, UPDATE.EXE reads the UPDATE.INF file to identify those files that should be present on the client for installation. For such a file, UPDATE.EXE then checks the client computer to see whether a file of the same name exists on the client. In the present embodiment, for each file required for installation, the .INF file specifies the name of the directory into which the file should be stored. This directory information also tells UPDATE.EXE where to look for existing files, if any, on the client. For each existing file found, UPDATE.EXE calculates its hash value for identifying its version. The hash process can take a short time, but occurs in the background while UPDATE.EXE is also displaying the end-user license agreement (EULA.TXT) for the user's consent, so the time needed for hashing is less noticeable.

As the file hashing proceeds, the hash of the existing file is compared with the hash of the corresponding "new" version, which is supplied in the UPDATE.INF file. Any existing file that has a hash matching the hash of "new" version will not be updated, and is accordingly excluded from the needed-files list.

As described above, the generation of the needed files list uses the information in the script file UPDATE.INF, which provides a list of files required for installing the newest version of the product, namely ABC 5.0 in the present example. FIG. 4 shows the contents of an exemplary version of UPDATE.INF. For simplicity and clarity of illustration, the shown contents of UPDATE.INF are significantly simplified. Referring to the text of the file UPDATE.INF, UPDATE.EXE iterates through each of the [ProductInstall.xxx] sections. The various section names are used within the INF to identify file lists and the locations where those files will be installed. The setup logic applies the appropriate semantics while processing each section.

The different [ProductInstall.xxx] sections allow the software vendor of ABC 5.0 to fine-tune the file copying operation. For example, the setup logic is programmed to always copy the files named in the [ProductInstall.CopyFilesAlways] section, whether the files already exist or not. Similarly, it has been programmed to copy a file listed in the [ProductInstall.ReplaceFilesIfExist] section only if the named file is already present on the system. In the [ProductInstall.CopyFilesAlways] section, there is a directive to copy the files itemized in the [CopyAlways.System32.files] section. The [DestinationDirs] section tells setup that any files copied for [CopyAlways.System32.files] will go into the \Windows\system32 directory. The files named in the [CopyAlways.System32.files] section include CHKNTFS.EXE, REGSVR32.EXE, and C_1250.NLS.

Since these files are always to be installed, UPDATE.EXE considers whether they need to be added to the needed-files list.

To determine whether the desired version of CHKNTFS.EXE exists on the client computer, the \Windows\system32 directory will be searched for the file CHKNTFS.EXE, and, if found, the hash of that file will be computed. The hash will then be checked against the known hash of the new version, which can be found in the [SourceDisksFiles] section. If the existing file's hash matches the value found in the script file UPDATE.INF, which is AF876D8F8DA7230C4D38BE30D3F92209 in this case, then the file will not have to be downloaded. On the other hand, if the hash is different, the name CHKNTFS.EXE will be added to the "needed files" list along with the hash that was computed. As will be described in greater detail below, this hash value indicates the version of the file existing on the client computer so that a proper patch for that version, if available, will be downloaded to the client. If the file is not found in the \Windows\system32 directory, the name CHKNTFS.EXE will be added to the "needed file" list without any hash value to indicate that the whole file is to be downloaded.

For the present example, it is assumed that CHKNTFS.EXE found on the client is not the most-recent version, and its hash value turns out to be BD23014729AD8940282FF2AAC2392041. It is therefore included in the needed files list, which is shown in FIG. 5 in its completed form. When REGSVR32.EXE is searched for, it is not found, so it is added to the list of needed files without a hash. However, when C_1250.NLS, a localization file, is checked, its hash matches the "new" value of 57A36CD7B3557535D4AFFB00F4D48EC6, so it is not added to the needed list. This situation can occur, for example, if this file was updated in some previous service pack, which has already been installed, and has not changed again since.

The [ProductInstall.ReplaceFilesIfExist] section in the UPDATE.INF file names two other lists of files to be copied. Two separate entries are used, because the files from the two lists are destined for different directories. For the files in [System32.files], the directory \Windows\system32 is searched, and the files are handled as described above.

For the files in [Drivers.files], the directory \Windows\system32\drivers is searched, and handled in a similar fashion. In contrast, the setup logic for the [ProductInstall.ReplaceFilesIfExist] states that, if the file is not found in the specified directory, an updated file will not be installed. Accordingly, only pre-existing files will be added to the list, and their entries will all include hash values. Note that it is quite unlikely to configure a system that includes all of the devices for which drivers are provided. The only files that will be included on the "needed files" list will be those for which the system actually contains that device. In the present example, the client machine contains no tape drives, and no joystick, so those drivers will not be required. The machine does have an E100 network adapter, but doesn't contain either of the other two network adapters listed. The machine does include the Compaq drive array controller. Finally, the [ProductInstall.UniprocessorFiles] and corresponding [ProductInstall.MultiprocessorFiles] sections provide and example of a mutually exclusive installation option. UPDATE.EXE will detect the actual hardware, and invoke only one of the two sections. The example machine happens to be a multi-processor machine, so it will not need the uniprocessor kernel file. The INF includes a directive to rename the multiprocessor kernel file from NTKRNLMP.EXE to NTOSKRNL.EXE later at install time. UPDATE.EXE has now completed "needed files" list, as shown in FIG. 5.

It will be appreciated that this example has been simplicity significantly. In the actual product, a typical "needed files" list would include perhaps 100 files out of about 1000 files listed in the .INF file. The benefit of selective installation thus becomes apparent: the list has been reduced over 90% by simple examination of the actual machine being updated.

At this point, the list of files needed for downloading is submitted to the download server 70. The needed files list is formatted and transmitted according to the transfer protocol requirements. In a preferred embodiment, the request is sent as an HTTP POST request. The request, as shown in FIG. 6, is posted to the server, and the system awaits the reply.

In the present example, the URL ("uniform resource locator", or Internet address) to submit the request to is also specified in the UPDATE.INF shown in FIG. 4 in the [Version] section, as the value named "SourceFilesURL." The URL address in this example is http://svcpacks.microsoft.com/isapi/pstream.dll/nt4sp5/USA/x86

Alternatively, multiple alternative URLs may be provided. For instance, the script file may include a [URLSection] identifying two alternative URLs as follows:

[URLSection]
URL1=http://server1
URL2=http://server2

In this case, if the server at URL1 is not available for download, the other server at URL2 may be used.

Moreover, relative URLs rather than absolute URLs may be used. An absolute URL is one that specifies a fixed network address, such as the SourceFileURL in the UPDATE.INF file. A relative URL, on the other hand, has to be combined with a base URL, which may be specified in a master setup script (see description in connection with FIG. 12) different from the script in which the relative URL is specified. For instance, the master setup script may specify the URL for the download site as:

PatchSiteURL=http://www.microsoft.com/ie/install
and a relative URL in a setup script for one software component may be specified as:

URL1=oepatch
The full URL for the download source will then be the combination of URL1 and PatchSiteURL:

http://www.microsoft.com/ie/install/oepatch
The use of relative addresses in the script provides flexibility in moving software updates from one download server to another server for purposes such as load balancing or site reorganization. With relative addresses, such change of download sites can be implemented easily by modifying only the base URL in the master script, without having to revise each of the individual scripts containing the relative URLs.

Figure 7:
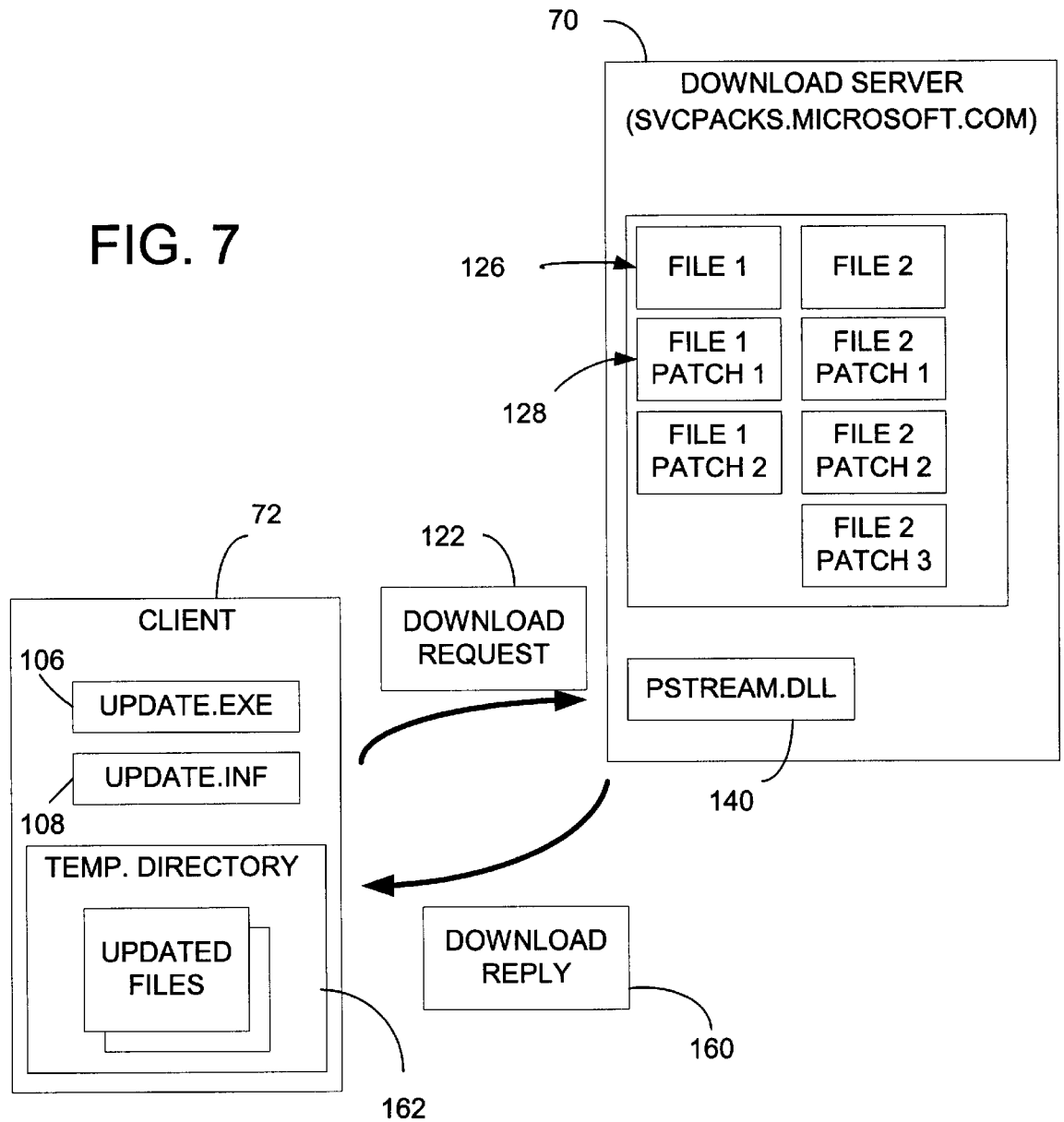
FIG. 7 is a schematic diagram showing an embodiment in which the client computer interacts with a download server to download update files.

Referring now to FIG. 7, the download server that handles the file request preferably contains a compressed copy 126 of the latest version of every file ever changed since the initial release of the software product, and patches 128 for each of those files from each of the recent revisions to the latest revision. In a preferred embodiment of the invention, the download server 70 is an Internet server running the Windows NT Operating System and the Internet Information Server (IIS) by Microsoft Corporation. The IIS supports custom add-on modules in a variety of formats, including native code executables conforming to the Internet Server Application Programming Interface (ISAPI.) In the illustrated embodiment, the download server 70 has an added ISAPI component 140 named PSTREAM.DLL that handles downloads from a file list. This component includes the logic to determine the optimal selection for each file listed in the request, the routines needed to format the reply header, and the means to send that reply back with all the needed file data attached.

In the present example, the incoming file request would be routed to PSTREAM's logic, and the remainder of the URL would be passed as the initial parameter. PSTREAM uses the remainder ("nt4sp5/USA/x86") to specify the file directory to be consulted on the server. In this case, the directory name identifies the product ("nt4sp5"), the country code ("USA"), and the processor platform ("x86") desired. The text of the file request is then processed.

For each file in the request, the download server determines the optimal file to transfer to the requesting computer. If a hash value is supplied with the file, the server will first look for a patch with the matching hash value. In this implementation, the names of the patch files on the server have been adorned with the corresponding hash of the older version. Files other than patches will typically be compressed, indicated by the last character of the name changed to an "_" character.

Because the request specifically identifies the version of each existing file by its hash value, each patch file can be created for a single "old" version, so no superfluous data will exist in the patch. The vendor is also not forced to consider every possible version of every file to be patched. For example, the vendor could supply patches only for users who have one of the two or three most-recent revisions. Systems with any other revisions will automatically revert to the compressed files. This is still a much-better situation than the "full download" scenario, where all installation files, regardless of whether they already exist on the client, will be downloaded. The flexibility of returning either a patch or a full file also prevents the risk of getting the client system in an in-between state due to patch mismatch, because if a patch file is not available, the full file will be downloaded instead.

By way of example, FIG. 8 shows a portion of the Files on svcpacks.microsoft.com in the nt4sp5\USA\x86 directory. For the first file in the request, CHKNTFS.EXE, the server looks for and finds a file named CHKNTFS.EXE_BD23014729AD8940282FF2AAC2392041.P, a patch that will fit the file on the user's system, and adds this file to the list of files to be sent. Similarly, the server is able to locate a patch file for CPQARRAY.SYS. For E100B.SYS, the server is not able to locate the file E100B.SYS_D49BB53612C639E36E05B941B1BF4AA9.P, suggesting that the user's system contains an unexpected version—perhaps from a beta release or a different vendor. The first fallback option is to look for a compressed file, E100B.SY_, which is found and queued. If that file had not been found, the next choice would be to look for the uncompressed file E100B.SYS. The patches for NTKRNLMP.EXE and OLE32.DLL are found and queued for inclusion in the return package 160.

In the case of the request for REGSVR32.EXE, no hash was included, so the server does not look for a patch file, even though several are available. This could occur because the user's system did not have any existing file (as in this case) or because a patch file had been previously received but could not be applied correctly. The file REGSVR32.EX_ is queued. A patch for the user's file WSOCK32.DLL with the given hash value of 8016769ECBBE2EE59026B7C50A54D693 cannot be found, so the server looks for WSOCK32.DL_. This file is not found either, so the server reverts to WSOCK32.DLL, which is found. This case might arise, for example, if the file is not compressible.

If any of the files in the request 122 could not be resolved, the download server would report an error instead of sending any data, so the user will not waste time downloading when it will ultimately not be able to complete installation. This situation could arise if there was an error in preparing the script (the .INF) in the initial setup package or if files are missing from the download server.

The PSTREAM module 140 continues to go through the requested file list until it has found a file to be returned for each requested file. Now the download server has a list of files to be returned, optimally chosen for this specific customer's system. This entire search process normally takes only a fraction of a second, and the elapsed time from starting the setup should be very short, probably under 15 seconds. Note that the server has no obligation to return the files in the order requested, or to return all the files in a single response. The server could, for example, choose to limit the size of any single response due to its workload from other concurrent client connections.

In a preferred embodiment, the server assembles a list of the files to be transferred to the client, and transmits the entire list and file data, including the patches and compressed files, as a single data stream. The "streaming" of downloaded data avoids significant per-file transfer overhead. The actual format of the data stream is similar to the format of a large compressed archive, with each file having a name, size, and its compressed contents. The server formats the reply list as needed for the receiving system, including the actual names of the files chosen and the size of each file in the attached stream of data. In a preferred embodiment, the download server could return the files in any order that allowed it to optimize file caching across those other connections. The returned file names and types would be identified by a numeric code, and the file names would be replaced with ordinal references to the files in the corresponding request. In this example, all the files being returned were identified in the header, before any actual file data. The file identifiers would be interleaved between each file's data, so the server would be able to dynamically adjust file ordering as the stream is transmitted. FIG. 9 shows, for example, the contents of a reply 160 from the download server to the client computer.

While some of the header information in the reply 160 might be interesting for a human reader, what is important to the receiving computer is the result code (200 in this case means no error.) The reply is then searched for the <body> tag. There the response indicates that 7 files are being returned, along with the name and size of each file. Immediately following the </body> tag is the raw returned data, with the first 3,305 bytes belonging to the file CHKNTFS.EXE.P, the next 2,704 bytes to CPQARRAY.SYS.P, etc.

The setup program, UPDATE.EXE in the example, immediately begins to act upon the incoming data as the stream is received. As the file transfer proceeds, the client computer begins breaking apart the received stream of the files into the constituent parts. The client computer determines what action for each file will be taken. In this simplified example, this can be determined by examination of the returned file name. A ".P" suffix indicates the returned data is in the form of a patch. A file name ending in "_" indicates the returned file is compressed. Otherwise, the returned file data is in its natural binary state. For each received file that is a patch for a given existing file of an older version, that file on the client is combined with the patch to generate the new version. For example, once the first 3,305 bytes have been received, processing can begin on combining the existing CHKNTFS.EXE file with the received patch data to generate the updated version of CHKNTFS.EXE called for in the UPDATE.INF file. The produced files are staged in a temporary directory. Files that are received as compressed files are decompressed into their normal form. Files that are sent without compression are simply stored as-is.

As these files are reconstituted, their hash values are computed. These values are checked against the hash values originally specified in the script file UPDATE.INF. As the files are checked, they are removed from the "needed files" list. Any files that do not verify properly will be left on the list for re-submission to the download server. This could occur, for example, if there were corruption in the returned data stream, or if there were a programming error in the compress or patch application code. If the file was received as a patch, the "old" hash value will be removed from the list to force the server to send the compressed file when the list is resubmitted. In this way, if the session is interrupted by a network error, disconnect, server problem, etc., the process will restart, preserving the progress that had been made and continuing where it left off. If a file is corrupted during transfer, only that one file will be re-transferred, without the intervention of the user.

In this embodiment, it is considered not necessary to add a code-signing certificate to every file in the product update. Adding such certificates would often swamp the size of a patch file by orders of magnitude. Since the initial file download (SP5SETUP.EXE) has a standard code-signing certificate, that trust can be extended to everything inside that package, including the hash values for all the other files. This provides equivalent security with significantly lower per-file overhead. This also means that the download server does not have to be trusted—if a download server were sending incorrect data, the receiver would be aware of this by checking the hash values of the downloaded files, and prevent installation of any compromised files.

Because the file transfer from the download server and the file processing by UPDATE.EXE are performed in parallel, the entire installation file set may be available shortly after the end of the download stream is reached. Once the entire received stream has been processed, UPDATE.EXE checks to see if any files remain on the "needed" list. If the download server has sent an incomplete response, or if the connection is dropped during transfer, one or more files will still be on the list, and the list will be re-submitted. The request submission and update downloading are iterated until there is no file remaining on the needed files list. At this point, all the files that were identified during the first phase of setup will be staged in the temporary directory 162 and verified.

In the final step of the downloading process, the setup logic is run again, but this time file copies and other system changes will be allowed to occur. Whenever UPDATE.EXE needs to copy a "new" file, it will obtain that file from the temporary directory where the received files were reconstituted. Because the complete installation file set is now present on the client, the setup program will be able to run to completion and properly upgrade the system. After all the files have been copied into their proper directories, the files in the temporary directory are deleted, then the files extracted from initial setup package SP5SETUP.EXE are also deleted. At this point, the system update is complete.

Depending upon the nature of the update, a system restart or further installation processing may occur, but these processes are not part of the automatic update download as described above.

Figure 12:
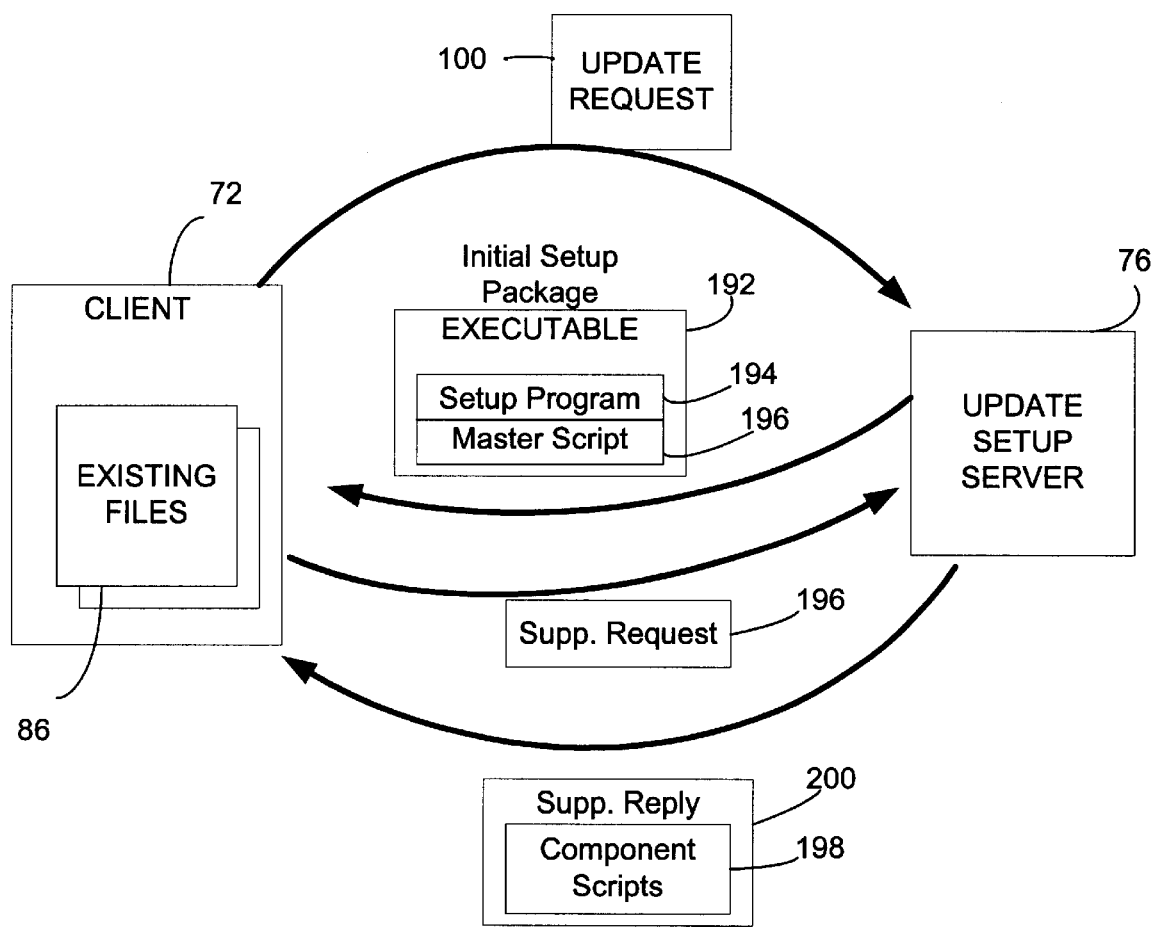
FIG. 12 is a schematic diagram showing the downloading of setup information from a setup server to a client in an alternative embodiment.

In the embodiment of FIG. 3, the script file containing the list of installation files is downloaded from the setup server in the same package with the setup program. In an alternative embodiment, one or more script files for downloading update data may be included with or downloaded separately from the setup program. This embodiment may be used, for instance, in the case where the software product has a plurality of substantially discrete components, and the user may select to update only some of the components. As shown in FIG. 12, when the user initiates the downloading process, an initial setup package 190 is downloaded from the setup server 76 to the client computer 72. The initial setup package 190 includes a setup program 192 and a master script 194 that contains general download information. When the setup program 192 is executed on the client computer, the user is prompted to select the components of the software product to be updated. The setup program then sends a supplemental request 196 to the setup server for the script files for the respective components to be updated. In response, the setup server 76 sends the requested script files 198 in a reply 200. Each of the script files 198 is tailored for the downloading of update data for one or more of the selected components and may contain the URLs of the servers from which the update data may be downloaded.

Even though the present invention has been described so far in the context of updating a software product, it will be appreciated that the same downloading process can be used to install an entirely new software product on a client computer, i.e., there is no older version of that product previously installed on the client. In the case of installing a new product there are, of course, no existing files on the client that can be patched. Thus, installing a new product can be viewed as just a special case of the general update downloading operation.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method of downloading update data to a client computer for installing a revised software product, comprising the steps of:

obtaining by the client computer an installation file list listing files required for installing the revised software product;

identifying existing files on the client computer corresponding to files listed in the installation file list;

constructing, based on the installation file list and the identified existing files, a needed-files list indicating files needed for updating the existing files to provide the files required for installing the revised software product;

transmitting a download request containing the needed-files list to a download server;

receiving a download reply containing downloaded files corresponding to the files on the needed-files list; and processing the downloaded files to update the existing files to provide the files required for installing the revised software product.

2. A method as in claim 1, wherein the step of identifying identifies a first existing file that is an earlier version of a corresponding file on the installation file list, and wherein the step of constructing includes said first existing file to the needed-files list with identification data indicative of said first existing file.

3. A method as in claim 2, wherein the identification data includes a hash value of said first existing file.

4. A method as in claim 2, wherein the step of identifying includes comparing a hash value of said first existing file with a hash value of said corresponding file in the installation file list to determine whether said existing file and said corresponding file are identical.

5. A method as in claim 2, wherein the step of processing includes determining whether the downloaded files includes a patch for said first existing file, and updating said first existing file with the patch.

6. A method as in claim 1, wherein the step of identifying includes searching for an existing file in a target directory for a corresponding file in the installation file list, said target directory specified in the installation file list.

7. A method as in claim 1, wherein the step of identifying determines there is no existing file on the client computer corresponding to a file on the installation file list, and the step of constructing includes said file on the installation file list on the needed-files list indicating.

8. A method as in claim 1, wherein the step of obtaining includes receiving a script file containing at least a portion of said installation file list.

9. A method as in claim 1, wherein the step of obtaining includes receiving a self-extracting setup package containing a setup program and a script file containing at least a portion of said installation file list, executing the setup package to extract the setup program and the script file, and executing the setup program.

10. A method as in claim 1, wherein the step of obtaining includes receiving a setup program, a script file containing at least a portion of said installation file list, and an update file corresponding to a selected file on said installation file list.

11. A method as in claim 1, wherein the step of obtaining includes sending a request for updating a selected component of the software program, and receiving a script file for said selected component containing at least a portion of said installation file list.

12. A method as in claim 11, wherein the step of obtaining further including receiving a setup program and a master script containing setup information, and executing the setup program for receiving input for selecting said selected component for updating.

13. A method as in claim 1, wherein the step of receiving receives the download reply as a stream, and step of processing separates downloaded files contained in a received portion of the stream before an end of the stream is received.

14. A method as in claim 13, wherein the stream contains the download files in an order different from an order of respective corresponding requested files in the download request.

15. A method as in claim 14, wherein the step of receiving includes dynamically identifying the downloaded files in the stream.

16. A method as in claim 1, wherein the step of processing includes removing from the needed-files list files for which proper corresponding downloaded files have been received in the download reply.

17. A method as in claim 16, further including the step of resubmitting the needed-files list when at least a file remains on the needed-files list after the download reply has been processed.

18. A method as in claim 1, wherein the step of processing including decompressing selected downloaded files.

19. A method as in claim 1, wherein the step of obtaining receives the installation file list from a setup server different from the download server.

20. A method as in claim 1, wherein the step of constructing includes detecting a hardware configuration of the client computer to selectively include files in the needed-files list.

21. A computer-readable medium having computer-executable modules/components for downloading updates to a client computer for installing a revised software product, comprising:
    (a) a script component containing an installation file list listing files required for installing at least a portion of the revised software product;
    (b) a setup module for execution on the client computer to perform the steps of:
        identifying existing files on the client computer corresponding to the files listed in the installation file list;
        constructing, based on the installation file list and the identified existing files, a needed-files list indicating files needed for updating the existing files to provide the files required for installing the revised software product;
        transmitting a download request containing the needed files list to a download server;
        receiving a download reply containing downloaded files corresponding to files on the needed-files list; and
        processing the downloaded files to update the existing files to provide the files required for installing the revised software product.

22. A computer-readable medium as in claim 21, wherein the script component includes a network address of the download server.

23. A computer-readable medium as in claim 22, wherein the network address is a relative address.

24. A computer-readable medium as in claim 21, wherein the script component includes a master script file containing setup information and at least one component script for updating a component of the software product.

25. A computer-readable medium as in claim 21, further comprising a self-extraction component combined with the script component and the setup module as a package and for execution on the client computer to extract the script component and the setup module from the package.

26. A computer-readable medium as in claim 21, wherein the installation file list in the script component includes a sub-list of files to be copied to the client computer regardless of whether there are existing files on the client computer corresponding to the files on the sub-list.

27. A computer-readable medium as in claim 21, wherein the installation file list in the script component includes a sub-list of files each to be copied to the client computer only when there is a corresponding existing file on the client computer.

28. A computer-readable medium as in claim 21, wherein the step of identifying identifies a first existing file that is an earlier version of a corresponding file on the installation file list, and wherein the step of constructing includes said first existing file on the needed-files list with identification data indicative of said first existing file.

29. A computer-readable medium as in claim 28, wherein the identification data includes a hash value of said first existing file.

30. A computer-readable medium as in claim 28, wherein the step of identifying includes comparing a hash value of said first existing file with a hash value of said corresponding file in the installation file list to determine whether said existing file and said corresponding file are identical.

31. A computer-readable medium as in claim 28, wherein the step of processing includes determining whether the downloaded files includes a patch for said first existing file, and updating said first existing file with the patch.

32. A computer-readable medium as in claim 21, wherein the step of identifying includes searching for an existing file in a target directory for a corresponding file in the installation file list, said target directory specified in the installation file list in the script component.

33. A computer-readable medium as in claim 21, wherein the step of identifying determines there is no existing file on the client computer corresponding to a file on the installation file list, and the step of constructing includes said file on the installation file list to the needed-files list.

34. A computer-readable medium as in claim 21, wherein the step of receiving receives the download reply as a stream, and step of processing separates downloaded files contained in a received portion of the stream before an end of the stream is received.

35. A computer-readable medium as in claim 34, wherein the stream contains the download files in an order different from an order of respective requested files in the download request.

36. A computer-readable medium as in claim 21, wherein the step of processing includes removing from the needed-files list files for which proper corresponding downloaded files have been received in the download reply.

37. A computer-readable medium as in claim 36, further including the step of resubmitting the needed-files list when files remain in the needed-files list after the download reply has been processed.

38. A computer-readable medium as in claim 21, wherein the step of processing including decompressing selected downloaded files.

39. A computer-readable medium as in claim 21, wherein the step of constructing includes detecting a hardware configuration of the client computer to selectively include files in the needed-files list.

40. A method of downloading update data from a download server to a client computer for installing a revised software on a client computer, comprising the steps of:
    (a) receiving, by the download computer from the client computer, a download request containing a needed-files list listing a plurality of requested files, each requested file having associated identification data;
    (b) for each requested file:
        determining from the identification data of said each requested file, whether a patch or a full file corresponding to said each requested file is requested;
        when a full file is requested, including a full file corresponding to said each requested file in a download reply;
        when a patch is requested, determining whether said patch is in a download database of the download server, and
            (i) when said patch is in the download database, including said patch in the download reply;
            (ii) when said patch is not in the download database, including a full file corresponding to said each requested file in the download reply;
    (c) transmitting the download reply to the client computer.

41. A method as in claim 40, wherein the step of transmitting transmits the download reply in a data stream.

42. A method as in claim 40, wherein the step of determining whether said patch is in the download database searches for the patch based on a hash value of said each requested file.

43. A method as in claim 40, wherein the step of transmitting transmits the downloaded files in the download reply in an order different from an order of the corresponding requested files in the download request.

44. A method as in claim 43, wherein the step of transmitting dynamically adjusts the order of the downloaded files in the download reply.

45. A computer readable medium containing computer-readable instructions for operating a download server to perform the steps of:

(a) receiving, by the download computer from a client computer, a download request containing a needed-files list listing a plurality of requested files, each requested file having identification data;

(b) for each requested file:
    determining from the identification data of said each requested file whether a patch or a full file corresponding to said each requested file is requested;
    when a full file is requested, including a full file corresponding to said each requested file in a download reply;
    when a patch is requested, determining whether said patch is in available, and
        (i) when said patch is available, including said patch in the download reply;
        (ii) when said patch is not available, including a full file corresponding to said each requested file in the download reply;

(c) transmitting the download reply to the client computer.

46. A computer-readable medium as in claim 45, wherein the step of transmitting transmits the download reply in a data stream.

47. A computer-readable medium as in claim 46, wherein the step of determining whether said patch is in the download database searches for the patch based on a hash value of said each requested file.

48. A computer-readable medium as in claim 47, wherein the step of transmitting transmits the downloaded files in the download reply in an order different from an order of the corresponding requested files in the download request.

49. A computer-readable medium as in claim 48, wherein the step of transmitting dynamically adjusts the order of the downloaded files in the download reply.

50. A system for downloading update data to a client computer for installing a revised software product, comprising:

(a) a setup server having setup data for transmitting to the client computer, the setup data including a setup module and a script component, the script component having an installation file list listing files required for installing the revised software product, the setup module containing computer executable instructions for performing, when executed on the client computer, the steps of:
    identifying existing files on the client computer corresponding to the files listed in the installation file list;
    constructing, based on the installation file list and the identified existing files, a needed-files list indicating files needed for updating the existing files to provide the files required for installing the revised software product;
    transmitting a download request containing the needed-files list;
    receiving a download reply containing downloaded files corresponding to the files in the needed-files list; and
    processing the downloaded files to update the existing files to provide the files required for installing the revised software product; and (b) a download server having an update database storing update data for the revised software product, the download server programmed for preparing a download reply containing downloaded files selected from the update database for transmission to the client computer, the downloaded files corresponding to the requested files in the download request.

\* \* \* \* \*